(12) United States Patent
Moy et al.

(10) Patent No.: US 9,613,389 B2
(45) Date of Patent: Apr. 4, 2017

(54) METHOD FOR HIDING TEXTURE LATENCY AND MANAGING REGISTERS ON A PROCESSOR

(75) Inventors: Simon Moy, Guangdong (CN); Shihao Wang, Guangdong (CN); Zhengqian Qiu, Guangdong (CN)

(73) Assignee: SHENZHEN ZHONGWEIDIAN TECHNOLOGY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 13/699,658

(22) PCT Filed: Dec. 14, 2011

(86) PCT No.: PCT/CN2011/084017
§ 371 (c)(1),
(2), (4) Date: Nov. 23, 2012

(87) PCT Pub. No.: WO2013/078733
PCT Pub. Date: Jun. 6, 2013

(65) Prior Publication Data
US 2014/0253567 A1    Sep. 11, 2014

(30) Foreign Application Priority Data

Nov. 28, 2011 (CN) .......................... 2011 1 0384569

(51) Int. Cl.
*G06T 1/20*  (2006.01)
*G06F 9/50*  (2006.01)

(52) U.S. Cl.
CPC .............. *G06T 1/20* (2013.01); *G06F 9/5011* (2013.01); *G06F 2209/507* (2013.01); *Y02B 60/142* (2013.01)

(58) Field of Classification Search
CPC ..... G06F 9/00; G06F 9/06; G06F 9/30; G06F 9/38; G06T 1/20
USPC .......................................... 345/522
See application file for complete search history.

(56) References Cited

U.S. PATENT DOCUMENTS

| | | | |
|---|---|---|---|
| 5,977,997 A * | 11/1999 | Vainsencher ................. | 345/519 |
| 6,182,108 B1 * | 1/2001 | Williams et al. ............. | 718/102 |
| 7,456,835 B2 * | 11/2008 | Lindholm et al. ............ | 345/501 |
| 2005/0044319 A1 * | 2/2005 | Olukotun ...................... | 711/118 |
| 2006/0114254 A1 * | 6/2006 | Day et al. ..................... | 345/424 |
| 2006/0190946 A1 * | 8/2006 | Kissell ......................... | 718/108 |
| 2011/0023040 A1 * | 1/2011 | Hendry et al. ............... | 718/102 |
| 2011/0040913 A1 * | 2/2011 | Chung et al. ................ | 710/264 |

(Continued)

*Primary Examiner* — Devona Faulk
*Assistant Examiner* — Hai Tao Sun
(74) *Attorney, Agent, or Firm* — Jackson IPG PLLC; Demian K. Jackson

(57) ABSTRACT

A method for hiding texture latency in a multi-thread virtual pipeline (MVP) processor including the steps of: allowing the MVP processor to start running a main rendering program; segmenting registers of various MVP kernel instances in the MVP processor according to the length set, acquiring a plurality of register sets with the same length, binding the register sets to chipsets of the processor at the beginning of the running of the kernel instance; allowing a shader thread to give up a processing time slot occupied by the shader thread after sending a texture detail request, and setting a Program Counter (PC) value in the case of return; and returning texture detail and allowing the shader thread to restart running.

3 Claims, 5 Drawing Sheets

(56) References Cited

U.S. PATENT DOCUMENTS

2011/0069076 A1\* 3/2011 Lindholm et al. ............ 345/552
2011/0072244 A1\* 3/2011 Lindholm et al. ............ 712/214

\* cited by examiner

METHOD FOR HIDING TEXTURE LATENCY AND MANAGING REGISTERS ON A PROCESSOR

FIELD OF THE INVENTION

The invention relates to the field of processors, in particular to a method for eliminating texture delay and managing registers on an UPU processor, MVP (MVP is short for "Multi-thread Virtual Pipeline", and the MVP processor is a processor with MVP dies).

BACKGROUND OF THE INVENTION

The Chinese patent application No. 201110088661.0 titled "A Multi-thread Processor and Method for Realizing the Functions of a CPU (Central Processing Unit) and a GPU (Graphics Processing Unit)" discloses an MVP processor capable of realizing CPU and GPU functions, wherein the MVP processor is correspondingly efficient in graphic processing due to a special hardware graphic processing part and a hybrid CPU and GPU thread. However, in the processor, in the case of graphic processing and particularly in the case of the running of a shader thread, once texture detail is involved, the thread also needs to send a request to a texture unit outside of an MVP core and waits for the texture unit to return data, but the texture unit usually require data from an external memory, process the data and then return the data to the thread that sent the texture request. In the process, the thread waits for the data to return. As the thread is running, the thread actually occupies a processing time slot of the core but takes no action in the waiting process, and then the resources are wasted and the energy is consumed. As the data return time is relatively long, the thread usually have longer delay, and even the shader thread may be stopped. Consequently, the efficiency of a programmable unified shader pipeline can be reduced and the performances of the processor can be degraded.

SUMMARY OF THE INVENTION

The technical problem to be solved by the invention is to overcome loss of performance in the prior art that the resources and energy are wasted and the delay is relatively long in the case of the realization of GPU functions and provide a method for hiding texture delay and managing registers in an MVP processor, in which the resources and energy are saved and the performances of the processor will not be degraded in the case of the realization of the GPU functions.

The technical proposal adopted by the invention to solve the technical problem is that: the invention relates to a method for hiding texture latency in an MVP processor, which comprises the following steps of:

A) allowing the MVP processor to start running a main rendering program, closing hardware interrupt enable for all the threads for rendering processing, and disabling hardware interrupt for all the threads;

B) segmenting registers of the MVP chipsets into a plurality of register sets having a same preset size;

C) allowing a shader thread to give up a processing time slot occupied by the shader thread (namely the time slot of a processing engine of the MVP processor or the processing engine and the processor occupied by the processing engine) to a backup thread in a waiting queue to run after sending a texture request, and setting a PC (Program Counter) value in the case of return; and D) returning texture detail and allowing the shader thread to wait for an idle processing time slot and restart running at a position pointed by the PC value.

In the method for hiding texture latency in the MVP processor, provided by the invention, the step B) further comprises the following steps of:

B1) grouping 128 registers in the MVP dies by allocating 16 registers into a segment; and B2) allocating the register sets to threads when the threads are created and sent to the waiting queue for the first time according to the rule that two register sets are allocated to dies for executing CPU functions and one register set is allocated to the shader thread.

In the method for hiding texture latency in the MVP processor, provided by the invention, the MVP processor comprises at least one hardware core, and the registers on the hardware core are grouped in the step B1).

In the method for eliminating texture delay in the MVP processor, provided by the invention, the step B2) further comprises the following step of: binding base addresses of the register sets and thread identification codes (thread IDs) together via hardware when the threads are created.

In the method for hiding texture latency in the MVP processor, provided by the invention, the shader thread accesses the register set bound therewith via a thread identification code of the shader thread in the case of running.

In the method for hiding texture latency in the MVP processor, provided by the invention, the step C) further comprises the following steps of:

C1) allowing the shader thread to send the texture detail request;

C2) allowing the shader thread and register ports bound therewith to give up the processing time slot of the processor together; and C3) allowing a first thread in the queue waiting for running to acquire the processing time slot and start running.

In the method for eliminating texture delay in the MVP processor, provided by the invention, the step D) further comprises the following steps of:

D1) allowing a texture unit arranged on the outside of an MVP core to acquire the texture detail required and storing the texture detail into a memory of the MVP core via the thread identification code of the shader thread;

D2) allowing the texture unit to inform the shader thread of the status of the texture request and allowing the shader thread to acquire the PC value and wait for the idle processing time slot; and D3) allowing the shader thread to restart running in the idle processing time slot from a program pointed by the PC value.

The invention also relates to a method for managing registers of graphic processing threads in an MVP processor, wherein the threads comprise registers allocated when the threads are created, and the control method comprises the following steps of:

M) integrally binding the registers grouped in advance in the MVP processor to kernel instance in the form of group and maintaining the subordinate relationship between register sets and the threads before the completion of the threads formed by the kernel instance; and N) releasing the register sets to the MVP processor as a whole after the threads finish running.

In the method for managing the registers of the graphic processing threads in the MVP processor, provided by the invention, addresses of the register sets are bound together with thread identification codes endowed to the threads by the MVP processor via hardware when the threads are created and initially sent to a waiting queue.

In the method for managing the registers of the graphic processing threads in the MVP processor, provided by the invention, a shader thread accesses registers bound therewith via a thread identification code in the case of running.

The method for hiding texture latency and managing the registers in the MVP processor, provided by the invention, has the advantages that: the shader thread and the registers bound therewith are suspended and the processing time slot is given up to other threads in the queue when the shader thread waits for external hardware to return the texture detail; the data are directly written into a memory of the shader thread when the detail is returned; and the shader thread restarts running when the processing time slot is idle. Therefore, the waiting time of the texture detail is effectively utilized and the thread does not need to be recreated, and consequently the resources and energy are correspondingly saved in the case of the realization of the GPU functions and the performances of the processor may not be degraded.

DETAILED DESCRIPTION OF THE PREFERRED EMBODIMENTS

Further description is given to the embodiment of the invention with the attached drawings.

Figure 1:
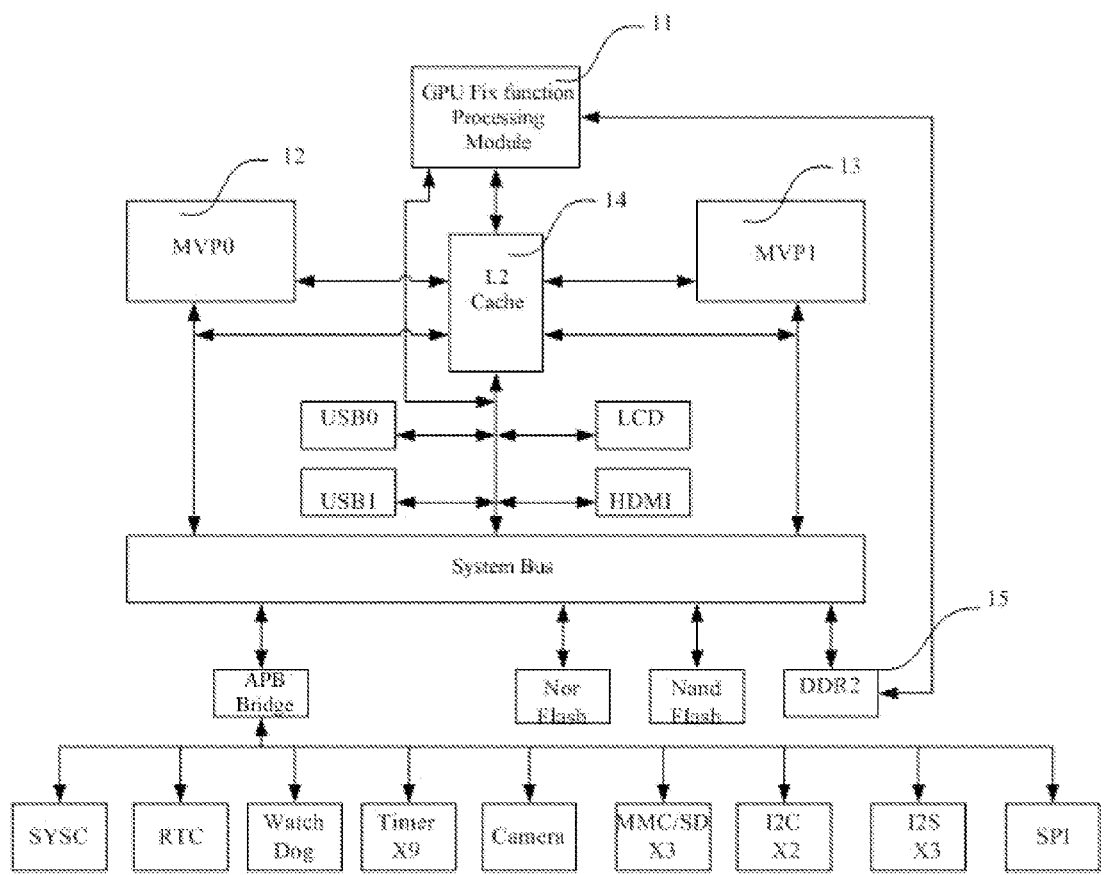
FIG. 1 is a structure diagram of an MVP processor in an embodiment of the method for eliminating texture delay and managing the registers in the MVP processor, provided by the invention.

As set forth, the embodiment of the invention is a method for hiding texture latency and managing registers, which is realized on an MVP processor. The MVP processor is as illustrated in FIG. 1 and is a multi-thread processor for realizing the functions of a CPU (Central Processing Unit) and a GPU (Graphics Processing Unit). The multi-thread processor comprises a GPU fix function processing module 11, a multi-thread parallel central processing module and a memory module, wherein in FIG. 1, the multi-thread parallel central processing module comprises two MVP (Multi-thread Virtual Pipeline) dies, namely MVP0 12 and MVP1 13; the memory module comprises L2 cache 14 and DDR2 15 as illustrated in FIG. 1; memories are connected with the GPU fix function processing module 11 and the multi-thread parallel central processing module via a bus and used for providing a unified memory space for data storage, buffering and/or interaction for the GPU fix function processing module 11 and the multi-thread parallel central processing module; the GPU fix function processing module 11 is used for processing the fix function of data in graphic processing; and the multi-thread parallel central processing module is used for realizing the program processing function and the programmable processing function of the data in graphic processing via unified thread scheduling and allowing the interaction between the graphic data which have realized the programmable processing function and the GPU fix function processing module 11 via the memory module (more specifically, the L2 cache 14). Moreover, the GPU fix function processing module 11 is a hardware structure independent of the MVP dies (12 and 13). For detail of a more specific structure of the MVP processor and operation details, see the Chinese patent No. 201110088661.0 titled "A Multi-thread Processor and Method for Realizing the Functions of a CPU (Central Processing Unit) and a GPU (Graphics Processing Unit)". No further detail is given here.

Figure 2:
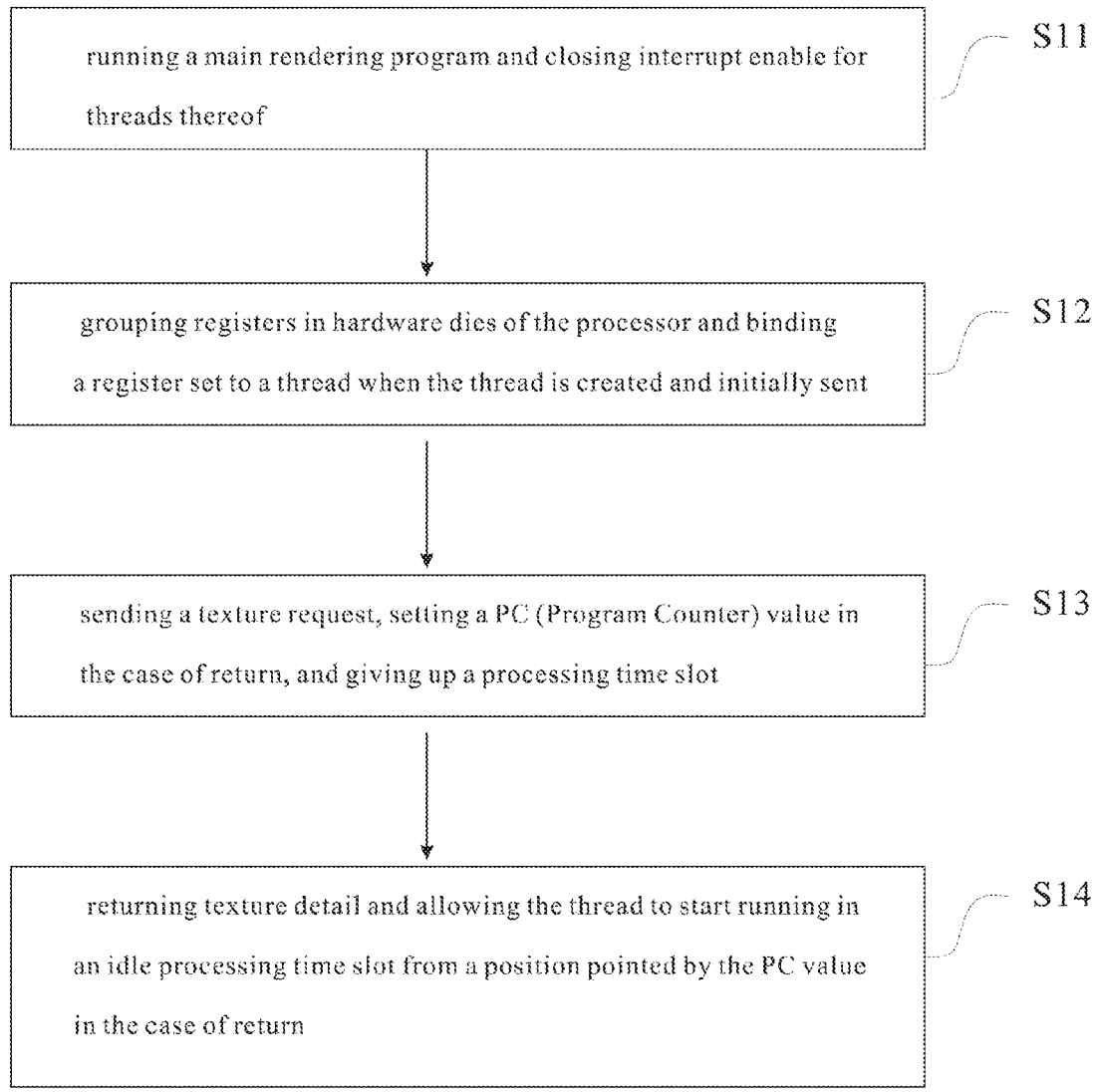
FIG. 2 is a flowchart illustrating the method for eliminating texture delay in the embodiment.

As illustrated in FIG. 2, in the embodiment, a shader thread is required to run in the case of the realization of the GPU functions, send a texture detail request to the GPU fix function processing module 11, and enter into the waiting status when waiting for the return of the texture detail, so that the resources and energy are wasted and the performances of the processor are degraded. Therefore, a method for managing registers in two dies (MVP0 and MVP1) and configuring a thread queue is used for overcoming the defects, wherein the method comprises the following steps of:

Step S11: running a main rendering program and closing interrupt enable for threads thereof. In the step, the MVP processor starts running the main rendering program, closes interrupt enable for all the threads for executing rendering processing, and disables interrupt for the threads. That is to say, in the step, a unified rendering architecture is accessed in the MVP processor for graphic processing; and except from leaving one part of processor resources in the MVP processor for realizing the CPU functions, other processor resources are all used for rendering processing in the realization of the GPU functions. The resources are used for running threads for realizing the GPU functions. However, the interrupt is disabled in the threads. Therefore, in the embodiment, under the same rendering architecture, the threads for realizing the GPU functions are disabled, so that the threads may not be interrupted in the running process.

Step S12: grouping registers in hardware dies of the processor, and binding a register set to a thread when the thread is created and initially sent. In the step, the registers of various MVP dies in the MVP processor are segmented according to the length set; register sets with same length are acquired; and the acquired register sets are bound to threads when the threads are created. Of course, in general, the register set is bound to the thread when the thread is created and sent to a waiting queue; the relationship between the register set and the thread is invariable in the running process of the thread; in the running process of the thread, a shader thread accesses registers or a register set bound therewith via a thread identification code; and when the thread is ended, the register set is still released in the form of one register set and waits for being bound to the next thread. For detail of the specific segmenting method of the dies in the MVP processor and the registers in the dies, detailed description is given later. In the step, one key point is that the length of all the register sets is same and set in advance (except from that part of registers left for realizing the CPU functions).

Step S13: sending a texture request, setting a PC (Program Counter) value in the case of return, and giving up a processing time slot. In the step, after the shader thread sends the texture detail request, an instruction point from which the texture detail is returned is set, namely the PC value from which the texture detail is returned is set, and then the shader thread gives up the processing time slot occupied by the shader thread to a prepared thread in the waiting queue to run. In the step, the shader thread is a thread under the same rendering architecture, sends the texture request to a texture unit of the MVP processor, and requires the texture detail; the texture unit is an independent hardware structure arranged on the outside of an MVP core; the backup threads in the waiting queue are actually other threads under the same rendering architecture; and the threads are also used for realizing the GPU functions, that is to say, the threads waiting for running are also threads used for graphic processing. Although the shader thread gives up the processing time slot, the relationship between the thread and the register set bound therewith still exists and is valid; the register set is not released; and the data thereof still exist.

Step S14: returning the texture detail and allowing the thread to start running in an idle processing time slot from a position pointed by the PC value in the case of return. In the step, when the texture detail is returned by the texture unit, the data are directly stored into a memory bound to the thread; and after the data storage, the shader thread begins to wait for the idle processing time slot and restarts running from an instruction pointed by the PC value once the idle processing time slot appears, that is to say, the thread stars running under the instruction pointed by the PC value. It's worth mentioning that in the step, when the idle processing time slot appears, the threads in the waiting queue do not run but the shader thread which is suspended in a manner and receives the texture detail runs.

Figure 3:
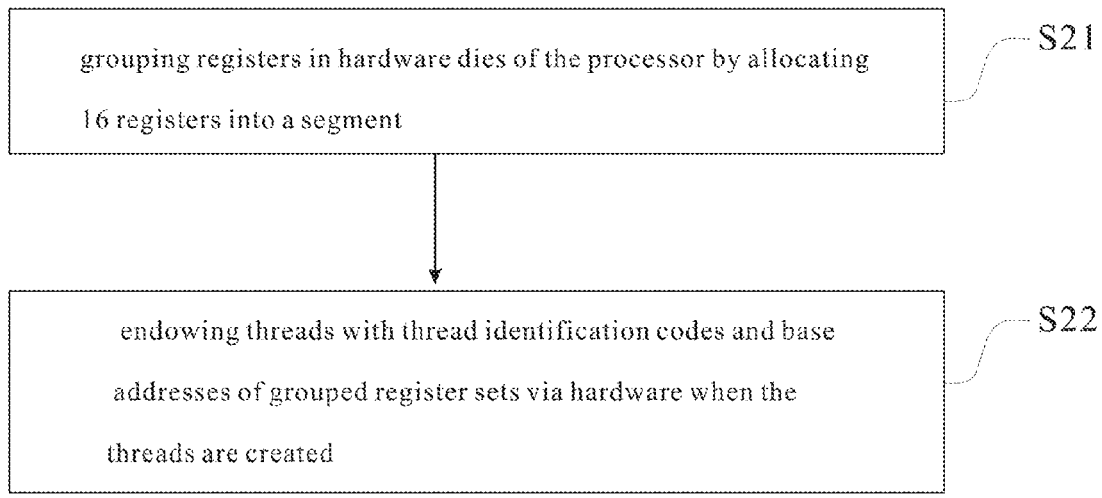
FIG. 3 is a flowchart illustrating register grouping and thread binding in the embodiment.

In the embodiment, the above steps can be also further divided, so as to achieve better operation effect or be more suitable to be applied in the MVP processor, such as the formation of the register sets and the give-up of the processing time slot. Further description on several correspondingly important steps is given below. As illustrated in FIG. 3, the step S12 further comprises the following steps of:

Step S21: grouping registers of each hardware die in the processor by allocating 16 registers into a segment. As set forth, the embodiment is realized on the MVP processor. In the embodiment, the MVP processor comprises two hardware dies, namely the MVP0 and the MVP1, wherein each hardware die has 128 32 bit registers (for detail of the structure of the processor dies and the registers, see the Chinese patent No. 201110088661.0 "A Multi-thread Processor and Method for Realizing the Functions of a CPU (Central Processing Unit) and a GPU (Graphics Processing Unit)". In the embodiment, the allocating means of the registers is that: 128 registers in the MVP hardware die are grouped by allocating 16 registers into a segment. When the register sets are allocated, if one die executes the CPU functions, two register sets will be allocated to the die and one register set will be allocated to the shader thread. In this way, when all the eight dies in the MVP processor execute the CPU functions, the 128 registers can only be allocated to 4 dies and the register sets can only be allocated to the other 4 dies after the dies to which the register sets are allocated finish running and release the register sets. When all the eight dies in the MVP processor are shaders, the 128 registers can be allocated to the eight dies. Therefore, the eight shader dies are dynamically activated and become 4 threads of the MVP. When the dies start running, the dies do not need to wait for other dies to release the register sets. Due to the register sets bound together with the dies, when the dies stop running or reenter, the contexts in the register sets do not need to be subjected to context backup and context restore. It's worth mentioning that in the embodiment, the thread is created by allocating the MVP dies and relevant data (including the shader configuration) to the idle processing time slot or a processing engine, so that the processor (more specifically, the processing time slot or the processing engine) can process data according to the rendering function set. From this perspective, the grouped register sets not only can be observed to be bound to the dies but also can be observed to be bound to the threads. Due to the characteristic, a plurality of actions can be reduced in the case of the suspension or reentrance of the threads, and then the operating time and the processor resources can be saved.

Step S22: endowing the threads with thread identification codes and base addresses of the grouped register sets via hardware when the threads are created and initially sent. In the MVP processor, when the threads are created, due to the characteristic of the MVP processor, certain registers are allocated to the created threads to achieve the local access performance of the threads, and thus the aims of reducing the data transfer in the processor core, reducing the energy consumption and accelerating the processing speed can be achieved. No exception is in the embodiment, with the difference as follows: the processor binds the thread identification codes (namely thread IDs) and the base addresses of the grouped register sets together via the hardware, and notifies the threads via instructions, so as to allocate the register sets at the addresses to the threads. Meanwhile, when the threads do not finish running, the register sets may not be released by the threads, that is to say, the register sets always belong to the threads in the period of the existing of the threads. In the embodiment, the threads are threads under the unified rendering architecture and used for processing image data, and the threads used for processing the CPU functions do not have the characteristic.

Figure 4:
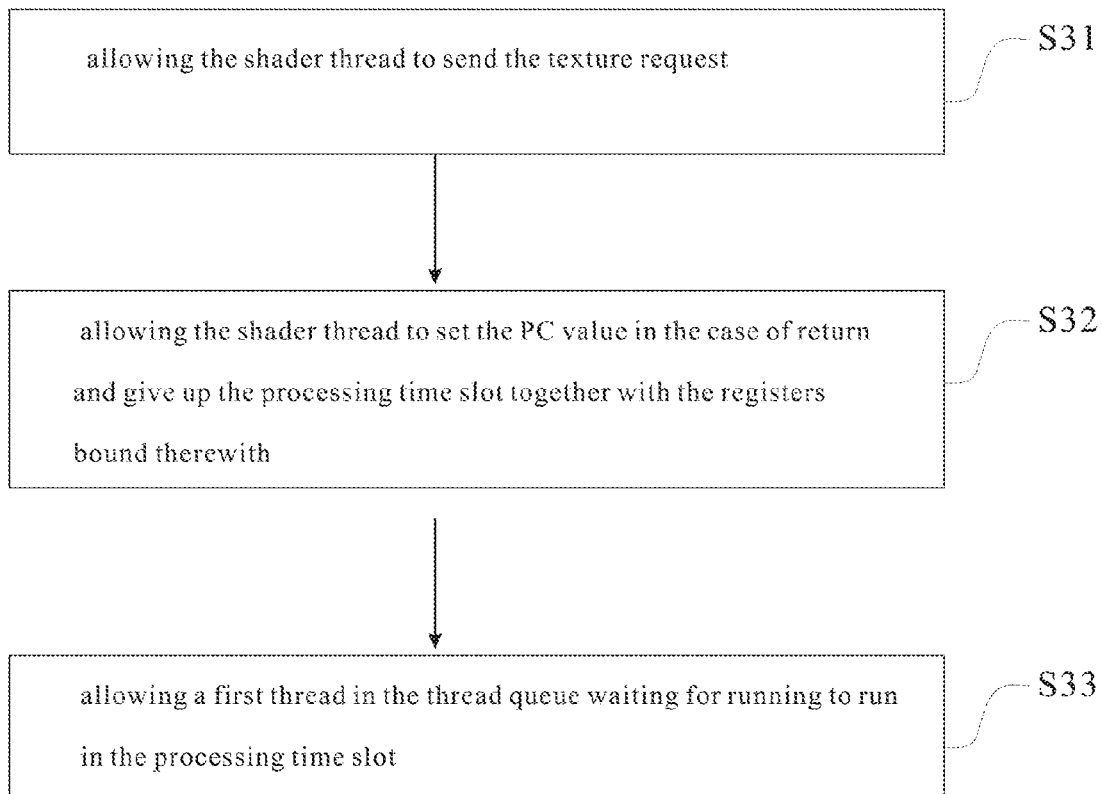
FIG. 4 is a flowchart, illustrating that a processing time slot is given up by a thread, in the embodiment.

As illustrated in FIG. 4, the step S13 further comprises the following steps of:

Step S31: allowing the shader thread to send the texture request. In the step, the shader thread sends the texture request to the external texture unit and requires the external texture unit to return the texture detail due to the demand.

Step S32: allowing the shader thread to set the PC value in the case of return and give up the processing time slot together with the registers bound therewith. After the request is sent, the shader thread begins to set the PC value in the case of return, so as to continue to run in the case of return. After the PC value is set, the shader thread gives up the processing time slot occupied by the thread. That is to say, in the step, in a manner, the shader thread is suspended together with local registers allocated to the thread and gives up the processing time slot when supposed to occupy the processing time slot and wait. Herein, the context in the register set is not emptied but maintained, so the data in the register set do not need to be reacquired when the thread reenters. The above is one characteristic of the embodiment. Due to the characteristic, the operating time can be reduced and the resources can be saved.

Step S33: allowing a first thread in the thread queue waiting for running to run in the processing time slot. As the processing time slot is given up by the shader thread in the above step, in the step, at least one idle processing time slot appears. Therefore, one thread in the thread queue waiting for running is acquired to occupy the processing time slot according to the rule of the MVP processor. In general, the thread is the first thread in the queue. In the embodiment, the thread in the queue waiting for running is also a graphic processing thread under the unified rendering architecture. Therefore, in the embodiment, it's possible that more than one shader threads would give up processing time slots, that is to say, it's possible that a plurality of shader threads and local registers allocated to the threads may be suspended.

Figure 5:
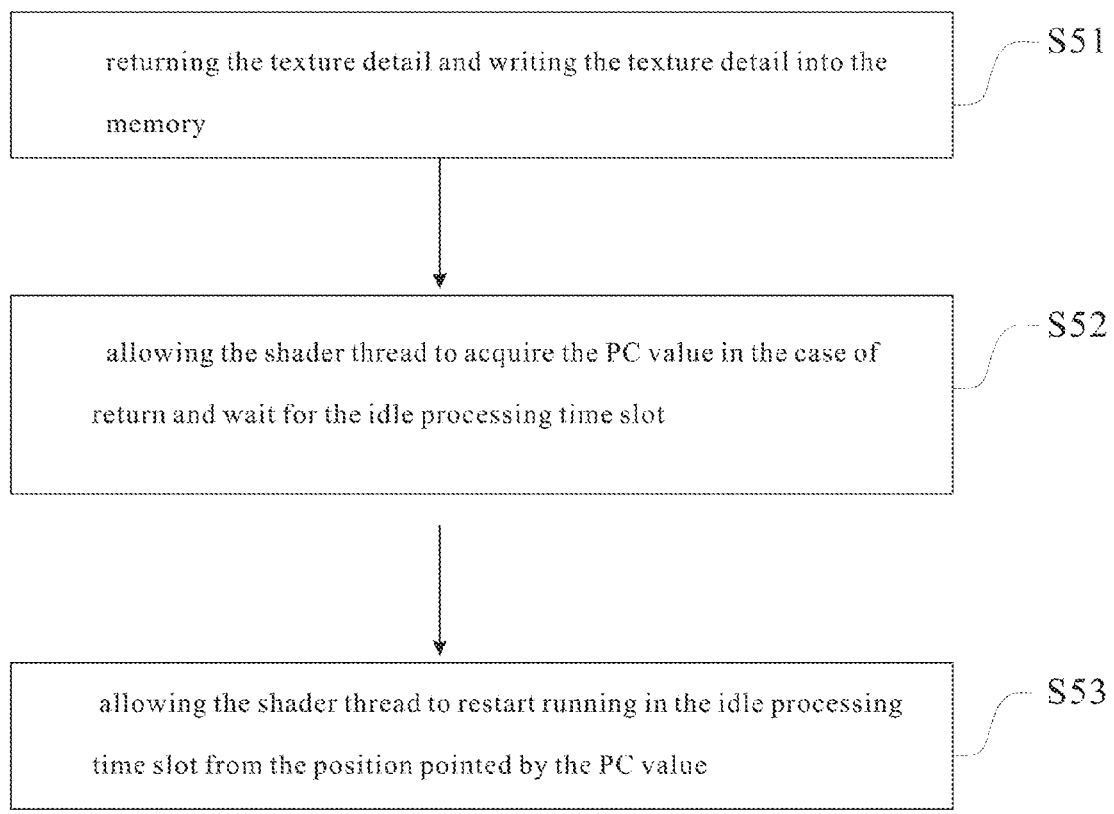
FIG. 5 is a flowchart, illustrating the rerun of the thread, in the embodiment.

Moreover, as illustrated in FIG. 5, the step S14 further comprises the following steps of:

Step S51: returning the texture detail and writing the texture detail into the memory. In the step, the texture detail data acquired are returned by the external texture unit and directly written into the registers bound together with the shader thread when returned. As the thread informs the texture unit of the thread ID of the thread when sending the request, the texture unit directly uses the thread ID to store the texture data into the internal memory of the MVP core when returning the texture data. As the same with other data, the data are also stored via L2 cache. Meanwhile, due to the binding relationship between the thread and the registers, the processor does not need to restore the local registers for the shader thread when the shader thread reenters. Therefore, the processing time of the shader thread is greatly shortened, and then the efficiency can be improved and the energy resources can be saved.

Step S52: allowing the shader thread to acquire the PC value in the case of return and wait for the idle processing time slot, namely acquiring a mapping thread of the texture data, acquiring the PC value set in the step S32, finding out a corresponding instruction, and waiting for the idle processing time slot. It's worth mentioning that in the step, the shader thread does not enter into the general queue waiting for running and is independent and may restart running once the idle processing time slot appears. That is to say, the priority of the shader thread is higher than that of the threads in the thread queue waiting for running. Of course, in other embodiments, the shader thread can also be arranged in the queue for waiting. However, the finish time of the shader thread may be prolonged.

Step S53: allowing the shader thread to restart running in the idle processing time slot from the position pointed by the PC value. In the step, the shader thread restarts running.

Figure 6:
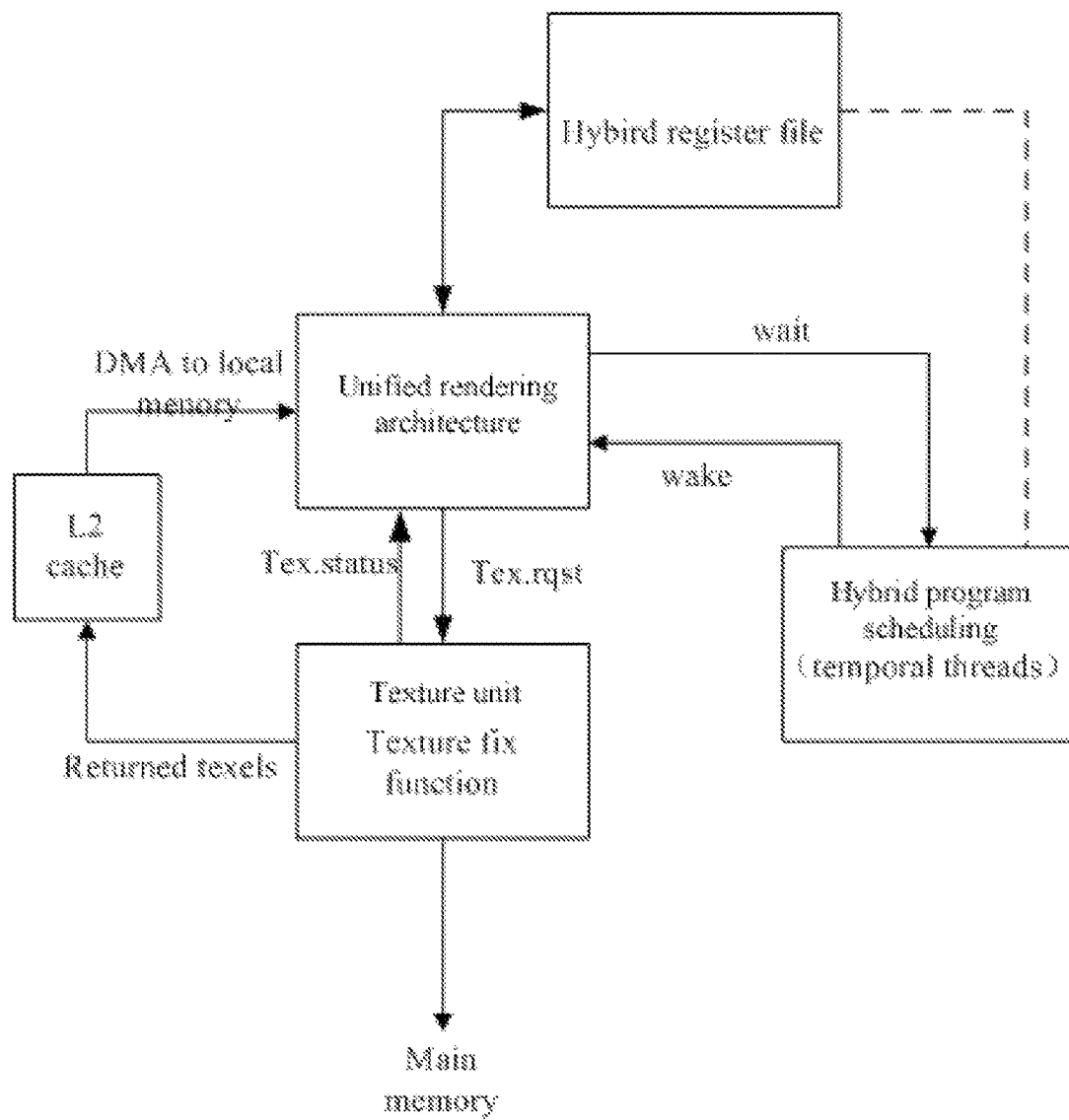
FIG. 6 is a schematic diagram, illustrating the data transmission of a shader thread, in the embodiment.

FIG. 6 illustrates the data direction of the shader thread under the unified rendering architecture in the embodiment or a general schematic diagram of the shader thread under the unified rendering architecture. As illustrated in FIG. 6, the shader thread is at a unified rendering architecture position in FIG. 6 when not making the texture request and at a hybrid program scheduling position in FIG. 6 when making the texture request and giving up the processing time slot. It's worth mentioning that the relationship between the registers bound together with the thread (hybrid register files in FIG. 6) and the thread is still maintained (as illustrated by the dashed line in FIG. 6). Meanwhile, the texture request is sent to the texture unit which acquires the texture data from the external main memory. After the texture data are acquired, the texture unit informs the unified rendering architecture of the status of the texture detail via tex.status signal, so that the unified rendering architecture knows that the texture detail has been acquired and written into the unified rendering architecture via the texture unit and the L2 cache and directly stored into the memory of the processor die according to the characteristic of the MVP. Subsequently, the shader thread is returned to the unified rendering architecture after acquiring the idle processing time slot.

The embodiment also relates to a method for managing registers of graphic processing threads in an MVP processor. The threads comprise registers allocated to the threads when the threads are created. The control method comprises the following steps of: integrally binding the registers grouped in advance in the MVP processor to the threads in the form of group, and maintaining the subordinate relationship between register sets and the threads before the completion of the thread. After the threads finish running, the register sets are released to the MVP processor as a whole. When the threads are created, base addresses of the register sets are bound together with thread identification codes endowed to the threads by the MVP processor via hardware. Moreover, a shader thread accesses registers bound therewith via a thread identification code in the case of running.

That is to say, the method for managing the registers of the image processing threads in the MVP processor is actually the method for hiding texture latency and managing the registers. For detail of the method, see the above description. However, the register management method is not just confined to texture processing or the shader thread but actually can be used by the graphic processing threads as long as the threads require data from the outside (namely the outsides of the hardware dies) and have long waiting time.

The embodiment only illustrates several implementations of the invention. Although the description is specific and detailed, the embodiment is not intended to limit the scope of protection of the patent for the invention. It shall be noted that various deformations and improvements can be made by those skilled in the art without departing from the concept of the invention and shall be all within the scope of protection of the invention. Therefore, the scope of protection of the patent for the invention shall be determined by the terms of the claims.

What is claimed is:

1. A method for hiding texture latency in a multi-thread virtual pipeline (MVP) processor comprising two MVP chipsets each having registers, a graphics processing unit (GPU) fix function processing module, and a memory module, the method comprising the steps of:

A) inducing the MVP processor to start running a main rendering program and disabling interrupt for all shader threads one part of processor resources of the MVP processor is directed to central processing unit (CPU) functions and all remaining processor resources of the MVP processor are directed to rendering processing in an interrupt disabled manner;

B) segmenting the registers into sets of preset equal size, invariably binding each of the register sets to a respective shader thread when the respective shader thread is created and for a duration of the respective shader thread, and releasing the register sets as the respective shader threads end, wherein the step B) further comprises the following steps of:

B1) grouping 128 registers in the MVP chipsets by allocating 16 registers into the register sets; and B2) allocating the register sets to threads when the threads are created and sent to the waiting queue for the first time according to the rule that two register sets are allocated to the MVP chipsets for executing the CPU functions and one register set is allocated to the shader thread, wherein the step B2) further comprises the following step of: binding base addresses of the register sets and thread identification codes together via hardware when the threads are created;

C) sending a texture detail request, setting a program counter (PC) value from which the texture detail request is returned, and inducing a given shader thread to give up a processing time slot occupied by the given shader thread to a backup thread in a waiting queue to run after sending the texture detail request; and D) returning the requested texture detail, storing the requested texture detail data, and inducing the given shader thread to wait for an idle processing time slot and restart running at a position pointed by the PC value once the idle processing time slot appears, wherein the step D) further comprises the following steps of:
- D1) inducing a texture unit arranged on the outside of the MVP chipsets to acquire the texture detail required and storing the texture detail into the respective register set of the MVP chipsets via the thread identification code of the shader thread;
- D2) inducing the texture unit to inform the shader thread of the status of the texture request and inducing the shader thread to set the PC value and wait for the idle processing time slot; and
- D3) inducing the shader thread to restart running in the idle processing time slot from the position pointed by the PC value.

2. The method for hiding texture latency in an MVP processor according to claim 1, wherein the shader thread accesses the register set bound therewith via a thread identification code of the shader thread in the case of running.

3. The method for hiding texture latency in an MVP processor according to claim 1, wherein the step C) further comprises the following steps of:
- C1) inducing the shader thread to send the texture detail request and set the PC value;
- C2) inducing the shader thread and the register set bound therewith to give up the processing time slot of the processor together; and
- C3) allowing a first thread in the queue waiting for running to acquire the processing time slot and start running.

* * * * *